(12) United States Patent
Weisman et al.

(10) Patent No.: US 11,252,966 B2
(45) Date of Patent: Feb. 22, 2022

(54) FIBROUS STRUCTURES COMPRISING A SURFACE CARE COMPOSITION AND METHODS FOR MAKING AND USING SAME

(71) Applicant: The Procter & Gamble Company, Cincinnati, OH (US)

(72) Inventors: Paul Thomas Weisman, Cincinnati, OH (US); Duane Larry Charbonneau, Mason, OH (US); Serena Rae Heyse, Springboro, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 268 days.

(21) Appl. No.: 14/602,419

(22) Filed: Jan. 22, 2015

(65) Prior Publication Data

US 2016/0213004 A1 Jul. 28, 2016

Related U.S. Application Data

(60) Provisional application No. 61/931,129, filed on Jan. 24, 2014.

(51) Int. Cl.
*A01N 63/40* (2020.01)

(52) U.S. Cl.
CPC .................... *A01N 63/40* (2020.01)

(58) Field of Classification Search
CPC ........... A01N 63/00; C12N 7/00; A47K 10/16
See application file for complete search history.

(56) References Cited

U.S. PATENT DOCUMENTS

| | | | |
|---|---|---|---|
| 6,699,701 B1 | 3/2004 | Sulakvelidze et al. | |
| 7,265,067 B1 * | 9/2007 | Phan | D21F 7/083 162/116 |
| 8,309,077 B2 * | 11/2012 | Murthy | A61K 35/76 424/93.6 |
| 2003/0108761 A1 * | 6/2003 | Eddlemon | D21H 21/36 428/537.5 |
| 2010/0068787 A1 * | 3/2010 | Pasternack | C12N 7/00 435/235.1 |
| 2010/0254950 A1 * | 10/2010 | Yoon | A01N 63/00 424/93.6 |
| 2014/0302283 A1 * | 10/2014 | Mellin | B31F 1/07 428/153 |

FOREIGN PATENT DOCUMENTS

| | | |
|---|---|---|
| EP | 1421855 A2 | 5/2004 |
| WO | 2005038430 A2 | 4/2005 |
| WO | 2009060097 A2 | 5/2009 |
| WO | 2012175749 A1 | 12/2012 |

OTHER PUBLICATIONS

Gilberto E. Flores, et al., "Diversity, Distribution and Sources of Bacteria in Residential Kitchens", Environmental Microbiology, pp. 1-9, 2012.
U.S. Appl. No. 14/576,246, filed Dec. 19, 2014, Robin Lynn McKiernan, et al.
International Search Report and Written Opinion; Application Ser. No. PCT/US2015/012420; dated Mar. 11, 2015, 10 pages.

* cited by examiner

*Primary Examiner* — Teresa E Knight
(74) *Attorney, Agent, or Firm* — C. Brant Cook (57) ABSTRACT

Fibrous structures containing a surface care composition, and more particularly dry fibrous structures containing a surface care composition comprising one or more bacteriophage, methods of making same, and methods for treating surfaces using same are provided.

23 Claims, 1 Drawing Sheet

FIBROUS STRUCTURES COMPRISING A SURFACE CARE COMPOSITION AND METHODS FOR MAKING AND USING SAME

FIELD OF THE INVENTION

The present invention relates to fibrous structures comprising a surface care composition, and more particularly to dry fibrous structures comprising a surface care composition comprising one or more surface care agents, for example one or more bacteriophage, methods of making same, and methods for treating surfaces using same.

BACKGROUND OF THE INVENTION

Among surfaces in our homes and public establishments that people frequent, such as restaurants, hospitals, manufacturing facilities, retail stores, and grocery stores, kitchen and bathroom surfaces, such as floors, countertops, appliances, sinks, faucets, shower walls, tubs, toilets, and trash cans, are among the most heavily colonized by bacteria, and these spaces are likely where humans and our companion animals are the most exposed to the broadest diversity of bacteria. Microbial exposure can arise both directly, for example from handling, preparing, and eating food, as well as indirectly, from contact with surfaces that harbor bacteria derived from a range of potential sources. Kitchen and bathroom surfaces can harbor pathogenic bacteria such as *Escherichia, Salmonella, Listeria*, and *Staphylococcus*. In fact, the kitchen has been implicated in having a number of surfaces highly susceptible to pathogenic bacterial contamination, including sink drains, sink basins, microwave interiors and exterior displays, garbage cans and disposals, faucet, refrigerator, oven, and microwave handles, oven doors, countertops, floors (particularly near sinks), produce and meat drawers (as well as other surfaces) within the refrigerators, stovetops, sponges, towels, and other dishcloths, and a variety of other kitchen surfaces (Flores et al., "Diversity, Distribution and Sources of Bacteria in Residential Kitchens," Environmental Microbiology, Volume 15, Issue 2, pp. 588-596 February 2013 (first published online November 2012, DOI: 10.1111/1462-2920.12036)). Bathrooms are also problematic, having a tendency to harbor the foregoing pathogenic bacteria on surfaces such as toilets, including flush handles, faucet handles, sinks, bathtubs (including drains), showers, floors, and any other type of bathroom surface.

Other surfaces, such as skin or epithelial tissue, can colonize pathogenic bacteria such as *Streptococcus, Escherichia, Salmonella, Listeria, Shigella, Campylobacter, Clostridium*, and *Staphylococcus*, and particularly *Streptococcus, Escherichia, Salmonella*, and *Staphylococcus*. Pathogenic bacteria can result in any of a variety of infections such as dermatitis, diaper rash, and impetigo, commonly caused by bacteria such as *Escherichia coli, Staphylococcus aureus, Streptococcus pyogenes*, and *Staphylococcus aureus*, in which the elderly, infants, and pre-school children are particularly susceptible. Other pathogenic conditions include other bacterial skin conditions such as urinary tract infections commonly suffered by women.

Even further, moist surfaces such as kitchen and bath sponges or other cleaning implements are generally most susceptible to the colonization of these and other bacteria. Unfortunately, consumers often use these contaminated implements in an attempt to clean and/or treat and/or disinfect surfaces, particularly those in the kitchen and bathroom, not realizing that such attempts are counter-productive and often result in introducing further bacterial contamination instead of disinfection. Moist skin surfaces, such as skin susceptible to diaper rash in infants and pre-school children are also particularly susceptible.

Unfortunately, in addition to counter-productive techniques such as using contaminated cleaning devices such as sponges, other techniques have limited efficacy. Diaper rash and other infections on skin are still common problems that are difficult to manage. Improved technologies are necessary to infect, lyse, destruct, disrupt, kill, inhibit the growth of, or otherwise reduce or eliminate these bacteria on surfaces.

One attempt by formulators to produce a fibrous structure that is more effective and/or efficient at reducing and/or eliminating bacteria from surfaces is a fibrous structure comprising a liquid composition comprising a bacteriophage. However, such a fibrous structure may require special packaging to maintain the effectiveness of the bacteriophage. Furthermore, fibrous structure comprising a liquid composition will require special packaging to prevent the liquid composition from drying out during distribution of the product from the manufacturer to the consumer.

Another attempt by formulators to produce a fibrous structure that is more effective and/or efficient at reducing and/or eliminating bacteria from surfaces is a fibrous structure that is contacted at the time of use with a liquid composition comprising one or more bacteriophage. However, such a system might require special packaging or bottling of the liquid composition comprising the bacteriophage to maintain the effectiveness of the bacteriophage until application of the liquid composition to a fibrous structure at the time of use. One problem with the known fibrous structures is that they might require the use of a liquid composition comprising bacteriophage, which necessitates the use of special packaging to maintain the effectiveness of the bacteriophage until use or during distribution and storage of the liquid composition. Furthermore, consumers find it inconvenient to have to have both a liquid composition comprising bacteriophage and an appropriate fibrous structure to reduce or eliminate these bacteria on surfaces. It would be more convenient to not have to seek both components when one desires to reduce or eliminate these bacteria on surfaces.

In addition to the described problems, bacteriophage are prone to have decreased activity or potency upon exposure to sunlight or ultraviolet (UV) light. Such exposure has a damaging effect on the bacteriophage, decreasing lytic ability. Fibrous structures comprising bacteriophage might also be susceptible to such decreased bacteriophage activity upon exposure to sunlight or UV light. Accordingly, there is a need for a fibrous structure manufacturer to devise approaches or means for maintaining the activity of bacteriophage containing fibrous structures during distribution of the fibrous structure from the manufacturer, to the retailer, to the consumer, and finally while being stored before use in the consumer's dwelling.

Another problem with incorporating surface care agents, such as bacteriophage into fibrous structures is that consumers of rolled tissue products, such as bathroom tissue and paper towels, generally prefer firm rolls. A firm roll conveys superior product quality and conveys sufficient fibrous structure material is present on the roll and consequently provides value for the consumer. A firm roll is one with a lower % compressibility value. From the standpoint of a fibrous structure manufacturer, however, providing a firm roll or one with a low compressibility after a surface care agent, for example a bacteriophage, is incorporated into the fibrous structure is a challenge.

Further, in order to provide a target roll diameter, while maintaining an acceptable cost of manufacture, the fibrous structure manufacturer must produce a finished fibrous structure roll having higher roll bulk. One means of increasing roll bulk is to wind the fibrous structure roll loosely. Loosely wound rolls however, have low firmness or high compressibility and are easily deformed, which makes them unappealing to consumers. The fibrous structure manufacturer's challenge becomes even greater as adding a surface care composition, especially an aqueous surface care composition, can decrease the bulk of the fibrous structure sheet and consequently decrease achievable roll bulk. As such, there is a need for fibrous structure rolls having high bulk as well as good firmness (low % compressibility) even after the fibrous structure has been modified to comprise a surface care composition. Furthermore, it is desirable to provide a rolled fibrous tissue product with high roll bulk and low % compressibility while comprising a high basis weight fibrous structure sheet spirally wound on the roll where the fibrous structure sheet provides greater absorbency, strength, and hand protection in use while simultaneously delivering surface care compositions to surfaces being treated or wiped.

Although it is desirable to provide a fibrous structure having high basis weight, greater absorbency, strength, spirally wound on a roll having high bulk and good roll firmness, while also comprising a surface care composition, improvement of one of these properties typically comes at the expense of another. For example, as the basis weight of the fibrous structure sheets is increased, achieving high roll bulk becomes more challenging since much of the bulk of the fibrous structure is achieved by molding of the embryonic fibrous structure web into the paper-making fabric and this bulk is decreased by increasing the basis weight of the fibrous structure sheet. Another example is that the bulk of the fibrous structure might be decreased by the addition of the surface care composition and then consequently have a negative impact on roll bulk, fibrous structure strength, and roll firmness.

Finally, in addition to the high roll bulk and good roll firmness (low % compressibility), consumers also often prefer multi-ply fibrous structures for the softness and absorbency characteristics inherent to multi-ply fibrous structures. Hence the fibrous structure manufacturer needs to strive to economically produce a fibrous structure roll delivering fibrous structures with surface care compositions that meet these often-contradictory parameters of large diameter, good firmness, with high quality fibrous structure sheets comprising high strength, absorbency, and softness, all at an acceptable cost.

Accordingly, there is a need for a rolled fibrous structure product with a firm roll, where a fibrous structure comprising a surface care composition is spirally wound on the roll. Furthermore, there is a need for a rolled fibrous structure product with a firm roll and also high roll bulk, where a fibrous structure comprising a surface care composition is spirally wound on the roll. There is also a need for such a fibrous structure roll where the surface care composition comprises a one or more bacteriophage such that the negatives or tradeoffs associated with known fibrous structures are avoided, methods of making such fibrous structure rolls, and methods for using such fibrous structure rolls for treating surfaces in need of treatment, such as surfaces that are susceptible to bacterial contamination.

Accordingly, there is a need for a dry fibrous structure comprising a bacteriophage composition comprising one or more bacteriophage such that the negatives associated with known fibrous structures are avoided, for example such that the dry fibrous structure does not need special packaging to maintain the effectiveness of the bacteriophage, methods of making such fibrous structures and methods for using such fibrous structures for treating surfaces in need of treatment, such as surfaces that are susceptible to bacterial contamination.

There is also a need for fibrous structure comprising surface care compositions, for example a surface care composition comprising bacteriophage, wherein the fibrous structure is capable of treating a one or more surfaces in need of treatment (for example a bacteria-contaminated surface) without negatively impacting the fibrous structure's physical properties such as strength, absorbency, roll bulk, % compressibility, modulus, elongation, and others.

Further, there is a need for fibrous structures comprising a surface care composition comprising one or more bacteriophage such that when such fibrous structures are used to treat surfaces, they provide efficacy against pathogenic bacteria in a variety of settings including in our homes, on skin and other epithelial tissue, and on any of a variety of other surfaces such as such as manufacturing plant surfaces and hospital surfaces.

SUMMARY OF THE INVENTION

The present invention fulfills the needs described above by providing dry fibrous structures comprising surface care compositions, for example surface care compositions comprising one or more bacteriophage, for example a bacteriophage composition, methods for making same, and methods for treating surfaces with same.

One solution to the problems identified above is a dry fibrous structure comprising a surface care composition comprising one or more bacteriophage. Such a dry fibrous structure avoids the need for special packaging in order to maintain the effectiveness of the bacteriophage.

Further, while not wishing to be bound by theory, the combination of the fibrous structure's, for example dry fibrous structure's physical properties, such as superior absorbency, strength, softness, and hand protection in use, and its ability to treat surfaces, for example while simultaneously delivering bacteriophage to surfaces being treated or wiped without negatively impacting the fibrous structure's physical properties is realized as a result of depositing the surface care composition, for example bacteriophage composition and/or bacteriophage so that the composition and/or bacteriophage reside on a surface of the fibrous structure, for example dry fibrous structure.

Unexpectedly, it has been found that one can achieve transfer of bacteriophage from a treated fibrous structure, for example dry fibrous structure, of the present invention while the fibrous structure is in a dry state (for example a dry fibrous structure) to another surface being treated, for example wiped. In fact, the dry transfer to a surface being treated with the fibrous structure, for example dry fibrous structure, is sufficient to provide the treated surface with a bacteriophage level which influences bacteria growth on the treated surface. Again, not wishing to be bound by theory, fibrous structures, for example dry fibrous structures, comprising one or more bacteriophage on its surface are unexpectedly realized through appropriate addition processes including printing and/or spraying of the surface care composition (bacteriophage composition) and/or bacteriophage onto a surface of the fibrous structure, for example dry fibrous structure. Importantly, these processes can be made to deliver the bacteriophage to the surface of the fibrous structure without altering its fiber spacing, bonding, and/or other microstructure properties, which means the bacteriophage treated fibrous structure of the present invention can exhibit superior absorbency, strength, softness, and hand protection in use that consumers desire. Furthermore, as fiber structure properties are preserved in this manner, it allows the fibrous structure manufacturer to wind rolls with high roll bulk (for example greater than 4 cm$^3$/g) and firm roll compressibility (low % compressibility, for example less than 10% compressibility). While having the bacteriophage resident on the surface of the fibrous structure would make it susceptible to the UV light or sunlight deactivation, it was unexpectedly discovered that by spirally winding the fibrous structure, for example dry fibrous structure, comprising a surface care composition comprising one or more bacteriophage on a roll and/or also putting the fibrous structure and/or fibrous structure roll into a package where the package material prevents the transmittance of UV light or sun light simultaneously realizes the cancellation of this potential loss of bacteriophage viability.

In one example of the present invention, a dry fibrous structure comprising a surface care composition comprising one or more bacteriophage, is provided.

In another example of the present invention, a sanitary tissue product comprising a dry fibrous structure according to the present invention, is provided.

In still another example of the present invention, a method for making a dry fibrous structure according to the present invention, wherein the method comprises the step of contacting a fibrous structure with a surface care composition comprising one or more bacteriophage such that a dry fibrous structure comprising the surface care composition is produced, is provided.

In yet another example of the present invention, a method for treating a surface in need of treatment, the method comprises the step of contacting the surface with a dry fibrous structure according to the present invention, is provided.

In even yet another example of the present invention, a method for treating a surface in need of treatment, the method comprises the steps of:
 a. contacting the dry fibrous structure according to the present invention with a liquid to produce liquid-containing fibrous structure; and
 b. contacting the surface with the liquid-containing fibrous structure, is provided.

The present invention provides dry fibrous structures comprising a surface care composition comprising one or more bacteriophage, a method for making such dry fibrous structures, and a method for using such dry fibrous structures to treat surfaces in need of treatment.

DETAILED DESCRIPTION OF THE INVENTION

Definitions

"Surface care composition" as used herein means a composition comprising one or more bacteriophage, for example one or more bacteriophage. In one example, the surface care composition of the present invention may be referred to as a bacteriophage composition. A "bacteriophage composition" as used herein means a composition comprising one or more bacteriophage. In one example, the bacteriophage composition, in addition to one or more bacteriophage, may further comprise positively charged compounds, such as tryptophan, lysine, or certain divalent cations (e.g., calcium, magnesium), or combinations thereof. Bacteria tend to be negatively charged, so adding positively charged elements to the bacteriophage composition may help associate the bacteriophages with nearby host bacteria. In some embodiments, the bacteriophage composition comprising one or more bacteriophage may further comprise a source of nutrition for the target bacteria, such as carbohydrate (e.g., monosaccharides), nucleotides (e.g., purines, pyrimadine), polymerase cofactor (e.g., manganese), or combinations thereof. It may be helpful for a bacterium infected by a bacteriophage to have adequate resources to replicate many bacteriophages before the bacteria lyses and dies. In this way, the number of bacteriophages available to intercept potentially harmful bacteria may increase with each bacteriophage-bacterium interaction. In this regard, polymerase cofactor and nucleotides may be particularly helpful, as these are nutrients which are specifically required for the host bacterium to manufacture new bacteriophages.

"Bacteriophage" as used herein means a virus that infects and replicates within bacteria. The term is derived from "bacteria" and the Greek word phagein, which means "to devour". Bacteriophages are composed of proteins that encapsulate a DNA and/or RNA genome, and may have relatively simple and/or elaborate structures. Their genomes may encode a few or over hundreds of genes. The bacteriophages replicate within bacteria following their injection of their genome into the bacteria's cytoplasm. Bacteriophages may be lytic or otherwise harmful to the bacteria of one or more undesirable bacteria strains. Undesirable bacteria strains may be or may produce compounds which are potentially pathogenic for humans and/or animals, and/or may be associated with spoilage, malodor, aesthetic decline, or other deterioration of a food product colonized by the undesirable bacteria. As used herein, "bacterium" or "target bacterium" refers to an undesirable micro-organism susceptible to infection and lysis, apoptosis, or alternate modes of cell death caused by a bacteriophage. Different bacteriophage may infect different strains of bacteria with different results and/or may infect some strains of bacteria but not others.

In other words, bacteriophages are naturally-occurring biological agents, viral in nature, that infect and replicate within bacteria. They are the most abundant and diverse biological entities on earth, naturally existing in seawater, fresh water, soil and generally wherever bacteria are present. Many types of bacteriophages kill their host bacteria cell after infection and replication. Because bacteriophages are absolutely specific to a particular type of host bacteria, however, they do not affect humans or animals.

Suitable bacteriophage may be selected based on the food and the pathogenic bacteria of interest. For example, for pet food kibble, *Salmonella* is a particular concern. *Salmonella* is common in chicken and chicken meal, which are common ingredients in dry or semi-moist pet food kibble. *Salmonella* is typically killed during food production, but because materials often handled in the plant may contain *Salmonella*, there is a chronic risk of contaminating finished product. Even tiny numbers of *Salmonella* bacteria can be problematic, as nutrient-rich food, such as pet food kibble, may be hospitable to bacterial growth. Exemplary bacteriophage that are lytic for certain species or strains of *Salmonella* (or other bacteria) include those described in U.S. Pat. No. 7,674,467; U.S. Pat. No. 7,211,426; U.S. Pat. No. 7,951,575; U.S. Pat. No. 8,021,657; and U.S. Patent Application Publication No. 2010/0166709. Other bacteriophage and their target bacterium or bacteria are known in the literature and can be selected for a specific food and target bacteria by one of ordinary skill in the art.

In one example, the suitable bacteriophage of the present invention are and/or include bacteriophage of the Siphoviridae, Podoviridae, or Myoviridae families, or combinations thereof. The bacteriophage may be wild-type or genetically modified or combinations thereof. The bacteriophage may be infective and lytic or otherwise fatal with respect to at least one species or strain of bacteria of the genus *Streptococcus, Enterobacterium, Escherichia, Salmonella, Listeria, Shigella, Campylobacter* or combinations thereof.

"Fibrous structure" as used herein means a structure that comprises one or more fibrous filaments and/or fibers. In one example, a fibrous structure according to the present invention means an orderly arrangement of filaments and/or fibers within a structure in order to perform a function. Non-limiting examples of fibrous structures of the present invention include paper, fabrics (including woven, knitted, and non-woven), and absorbent pads (for example for diapers or feminine hygiene products).

Non-limiting examples of processes for making fibrous structures include known wet-laid processes, such as wet-laid papermaking processes, and air-laid processes, such as air-laid papermaking processes. Wet-laid and/or air-laid papermaking processes typically include a step of preparing a composition comprising a plurality of fibers that are suspended in a medium, either wet, more specifically aqueous medium, or dry, more specifically gaseous medium, such as air. The aqueous medium used for wet-laid processes is oftentimes referred to as a fiber slurry. The fiber composition is then used to deposit a plurality of fibers onto a forming wire or belt such that an embryonic fibrous structure is formed, after which drying and/or bonding the fibers together results in a fibrous structure. Further processing the fibrous structure may be carried out such that a finished fibrous structure is formed. For example, in typical papermaking processes, the finished fibrous structure is the fibrous structure that is wound on the reel at the end of papermaking, and may subsequently be converted into a finished product, e.g. a sanitary tissue product.

Non-limiting examples of other known processes and/or unit operations for making fibrous structures include fabric crepe and/or belt crepe processes, ATMOS processes, NTT processes, through-air-dried processes, uncreped through-air-dried processes, and conventional wet press processes.

Another process that can be used to produce the fibrous structures is a melt-blowing, dry spinning, and/or spunbonding process where a polymer composition is spun into filaments and collected on a belt to produce a fibrous structure. In one example, a plurality of fibers may be mixed with the filaments prior to collecting on the belt and/or a plurality of fibers may be deposited on a prior produced fibrous structure comprising filaments.

The fibrous structures of the present invention may be homogeneous or may be layered in the direction normal to the machine direction. If layered, the fibrous structures may comprise at least two and/or at least three and/or at least four and/or at least five layers.

The fibrous structures of the present invention may be co-formed fibrous structures. "Co-formed" as used herein means that the fibrous structure comprises a mixture of at least two different components wherein at least one of the components comprises a filament, such as a polypropylene filament, and at least one other component, different from the first component, comprises a solid additive, such as a fiber and/or a particulate. In one example, a co-formed fibrous structure comprises solid additives, such as fibers, such as wood pulp fibers and/or absorbent gel articles of manufacture and/or filler particles and/or particulate spot bonding powders and/or clays, and filaments, such as polypropylene filaments. In yet another example, a co-formed structure comprises those described in U.S. Pat. No. 8,017,534.

In one example, the fibrous structures of the present invention may comprise man-made fibers, natural fibers, and combinations thereof, and may or may not be biodegradable. Non-limiting examples of man-made fibers include: rayon, which in turn includes but is not limited to viscose, lyocell and mixtures thereof; polyhydroxyalkanoates; polylactic acid; polyester; and mixtures thereof. Non-limiting examples of natural fibers include: pulp, cotton, wool, silk, jute, linen, ramie, hemp, flax, camel hair, kenaf, bamboo, and mixtures thereof. Non-thermoplastic fibers that are of use in the present invention are selected from the group consisting of: rayon, which in turn includes but is not limited to viscose, lyocell and mixtures thereof; pulp; cotton; wool; silk; jute; linen; ramie; hemp; flax; camel hair; kenaf; and mixtures thereof.

In one example, the fibrous structures of the present invention may be manufactured via fiber laying, fiber bonding, or combinations thereof. Fiber laying steps known in the art include, but are not limited to, spunlaying, meltblowing, carding, airlaying, wetlaying and combinations thereof, of the filaments and/or fibers comprising the fibrous structure. Fiber bonding steps known in the art include, but are not limited to, spunlacing (or hydroentangling), cold calendering, hot calendering, air thru bonding, chemical bonding, needle punching and combinations thereof. In one example, the dry fibrous structure comprises a fibrous structure selected from the group consisting of: air-laid fibrous structures, wet-laid fibrous structures, high loft nonwoven fibrous structures, needlepunched fibrous structures, hydroentangled fibrous structures, fiber tow fibrous structures, woven fibrous structures, knitted fibrous structures, flocked fibrous structures, spunbond fibrous structures, carded fibrous structures, spunbond/meltblown fibrous structures, spunbond/meltblown/spunbond fibrous structures, meltblown fibrous structures, carded fibrous structures, coform fibrous structures, and combinations thereof.

"Dry fibrous structure" as used herein means that the fibrous structure exhibits a moisture (water) content of less than 20% and/or less than 15% and/or less than 10% and/or less than 7% and/or less than 5% and/or less than 3% and/or less than 1% to 0% and or to greater than 0% by weight of the dry fibrous structure as measured according to the Water Content Test Method described herein. In one example, the dry fibrous structure of the present invention exhibits a moisture (water) content of from about 0.0001% to about 20% and/or from about 0.001% to about 15% and/or from about 0.001% to about 12% and/or from about 0.001% to about 10% and/or from about 0.001% to about 7% and/or from about 0.001% to about 5%, by weight of the dry fibrous structure.

"Fiber" and/or "Filament" as used herein means an elongate particulate having an apparent length greatly exceeding its apparent width, i.e. a length to diameter ratio of at least about 10. For purposes of the present invention, a "fiber" is an elongate particulate as described above that exhibits a length of less than 5.08 cm (2 in.) and a "filament" is an elongate particulate as described above that exhibits a length of greater than or equal to 5.08 cm (2 in.).

Fibers are typically considered discontinuous in nature. Non-limiting examples of fibers include wood pulp fibers and synthetic staple fibers such as polyester fibers.

Filaments are typically considered continuous or substantially continuous in nature. Filaments are relatively longer than fibers. Non-limiting examples of filaments include meltblown and/or spunbond filaments. Non-limiting examples of materials that can be spun into filaments include natural polymers, such as starch, starch derivatives, cellulose and cellulose derivatives, hemicellulose, hemicellulose derivatives, chitin, chitosan, polyisoprene (cis and trans), peptides, polyhydroxyalkanoates, and synthetic polymers including, but not limited to, thermoplastic polymer filaments comprising thermoplastic polymers, such as polyesters, nylons, polyolefins such as polypropylene filaments, polyethylene filaments, polyvinyl alcohol and polyvinyl alcohol derivatives, sodium polyacrylate (absorbent gel material) filaments, and copolymers of polyolefins such as polyethylene-octene, and biodegradable or compostable thermoplastic fibers such as polylactic acid filaments, polyvinyl alcohol filaments, and polycaprolactone filaments. In one example, the filament comprises a thermoplastic polymer selected from the group consisting of: polypropylene, polyethylene, polyester, polylactic acid, polyhydroxyalkanoate, polyvinyl alcohol, polycaprolactone, styrene-butadiene-styrene block copolymer, styrene-isoprene-styrene block copolymer, poly-urethane, and mixtures thereof. In another example, the filament comprises a thermoplastic polymer is selected from the group consisting of: polypropylene, polyethylene, polyester, polylactic acid, polyhydroxyalkanoate, polyvinyl alcohol, polycaprolactone, and mixtures thereof.

The filaments may be monocomponent or multicomponent, such as bicomponent filaments.

In one example, the filaments exhibits an average fiber diameter of less than 50 µm and/or less than 25 µm and/or less than 15 µm and/or less than 12 µm (also referred to as "microfilaments") and/or less than 10 µm and/or less than 6 µm.

In one example of the present invention, "fiber" refers to papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. U.S. Pat. No. 4,300,981 and U.S. Pat. No. 3,994,771 are incorporated herein by reference for the purpose of disclosing layering of hardwood and softwood fibers. Also applicable to the present invention are fibers derived from recycled paper, which may contain any or all of the above categories as well as other non-fibrous materials such as fillers and adhesives used to facilitate the original papermaking.

In addition to the various wood pulp fibers, other fibers such as cotton linters, rayon, lyocell, trichomes, seed hairs, and bagasse can be used in this invention.

Other sources of cellulose in the form of fibers or capable of being spun into fibers include grasses and grain sources.

"Sanitary tissue product" as used herein means a soft, low density (i.e. <about 0.15 g/cm$^3$) web useful as a wiping implement for post-urinary and post-bowel movement cleaning (toilet tissue), for otorhinolaryngological discharges (facial tissue), and multi-functional absorbent and cleaning uses (absorbent towels). Non-limiting examples of suitable sanitary tissue products of the present invention include paper towels, bath tissue, facial tissue, napkins, baby wipes, adult wipes, wet wipes, cleaning wipes, polishing wipes, cosmetic wipes, car care wipes, wipes that comprise an active agent for performing a particular function, cleaning substrates for use with implements, such as a Swiffer® cleaning wipe/pad. The sanitary tissue product may be convolutedly wound upon itself about a core or without a core to form a sanitary tissue product roll.

In one example, the sanitary tissue product of the present invention comprises a fibrous structure, for example a dry fibrous structure, according to the present invention.

The sanitary tissue products and/or fibrous structures of the present invention may exhibit a basis weight between about 5 g/m$^2$ to about 120 g/m$^2$ and/or from about 10 g/m$^2$ to about 120 g/m$^2$ and/or from about 15 g/m$^2$ to about 110 g/m$^2$ and/or from about 20 g/m$^2$ to about 100 g/m$^2$ and/or from about 30 to 90 g/m$^2$ as measured according to the Basis Weight Test Method described herein. In addition, the sanitary tissue product of the present invention may exhibit a basis weight between about 40 g/m$^2$ to about 120 g/m$^2$ and/or from about 50 g/m$^2$ to about 110 g/m$^2$ and/or from about 55 g/m$^2$ to about 105 g/m$^2$ and/or from about 60 to 100 g/m$^2$ as measured according to the Basis Weight Test Method described herein.

The sanitary tissue products and/or fibrous structures of the present invention may exhibit an initial total wet tensile strength of less than about 78 g/cm (200 g/in) and/or less than about 59 g/cm (150 g/in) and/or less than about 39 g/cm (100 g/in) and/or less than about 29 g/cm (75 g/in).

The sanitary tissue products and/or fibrous structures of the present invention may exhibit an initial total wet tensile strength of at least 118 g/cm (300 g/in) and/or at least 157 g/cm (400 g/in) and/or at least 196 g/cm (500 g/in) and/or at least 236 g/cm (600 g/in) and/or at least 276 g/cm (700 On) and/or at least 315 g/cm (800 g/in) and/or at least 354 g/cm (900 g/in) and/or at least 394 g/cm (1000 g/in) and/or from about 118 g/cm (300 g/in) to about 1968 g/cm (5000 g/in) and/or from about 157 g/cm (400 g/in) to about 1181 g/cm (3000 g/in) and/or from about 196 g/cm (500 g/in) to about 984 g/cm (2500 g/in) and/or from about 196 g/cm (500 g/in) to about 787 g/cm (2000 g/in) and/or from about 196 g/cm (500 g/in) to about 591 g/cm (1500 g/in) as measured according to the Initial Total Wet Tensile Test Method described herein.

The sanitary tissue products and/or fibrous structures of the present invention may exhibit a density of less than about 0.60 g/cm$^3$ and/or less than about 0.30 g/cm$^3$ and/or less than about 0.20 g/cm$^3$ and/or less than about 0.10 g/cm$^3$ and/or less than about 0.07 g/cm$^3$ and/or less than about 0.05 g/cm$^3$ and/or from about 0.01 g/cm$^3$ to about 0.20 g/cm$^3$ and/or from about 0.02 g/cm$^3$ to about 0.10 g/cm$^3$ as measured according to the Density Test Method described herein.

The sanitary tissue products of the present invention may be in the form of sanitary tissue product rolls. Such sanitary tissue product rolls may comprise a plurality of connected, but perforated sheets of fibrous structure, that are separably dispensable from adjacent sheets. In one example, one or more ends of the roll of sanitary tissue product may comprise an adhesive and/or dry strength agent to mitigate the loss of fibers, especially wood pulp fibers from the ends of the roll of sanitary tissue product.

The sanitary tissue products and/or fibrous structures of the present invention may comprises additives such as softening agents, temporary wet strength agents, permanent wet strength agents, bulk softening agents, lotions, silicones, wetting agents, latexes, especially surface-pattern-applied latexes, dry strength agents such as carboxymethylcellulose and starch, absorbency aids, and other types of additives suitable for inclusion in and/or on sanitary tissue products.

"Basis Weight" as used herein is the weight per unit area of a sample reported in lbs/3000 ft$^2$ or g/m$^2$ and is measured according to the Basis Weight Test Method described herein.

"Roll Bulk" as used herein is the volume of paper divided by its mass on the wound roll. Roll Bulk is calculated by multiplying $\pi$ (3.142) by the quantity obtained by calculating the difference of the roll diameter squared in cm squared (cm$^2$) and the outer core diameter squared in cm squared (cm$^2$) divided by 4, divided by the quantity sheet length in cm multiplied by the sheet count multiplied by the Bone Dry Basis Weight of the sheet in grams (g) per cm squared (cm$^2$) as measured according to the Basis Weight Test Method described herein.

"Machine Direction" or "MD" as used herein means the direction parallel to the flow of The fibrous structure through the fibrous structure making machine and/or sanitary tissue product manufacturing equipment.

"Cross Machine Direction" or "CD" as used herein means the direction parallel to the width of the fibrous structure making machine and/or sanitary tissue product manufacturing equipment and perpendicular to the machine direction.

"Ply" as used herein means an individual, integral fibrous structure.

"Plies" as used herein means two or more individual, integral fibrous structures disposed in a substantially contiguous, face-to-face relationship with one another, forming a multi-ply fibrous structure and/or multi-ply sanitary tissue product. It is also contemplated that an individual, integral fibrous structure can effectively form a multi-ply fibrous structure, for example, by being folded on itself.

Fibrous Structure

The fibrous structures of the present invention comprise a surface care composition comprising one or more bacteriophage. The surface care composition (bacteriophage composition) of the present invention may be releasably associated with the fibrous structures, for example may be present primarily on or substantially on one or more surfaces of the fibrous structures, such that at least a portion of the surface care composition (bacteriophage composition); namely, one or more bacteriophages within the one or more bacteriophage is transferred to a surface upon contact, with or without pressure and/or wiping, by the fibrous structures. In other words, at least a portion of the surface care composition of the present invention comprising one or more bacteriophages is transferable from the fibrous structure, for example dry fibrous structure, to a surface during use by a consumer. In one example, at least a portion of the surface care composition (bacteriophage composition) is present on a surface of the fibrous structure, for example dry fibrous structure. The fibrous structures of the present invention may be particularly advantageous because the transfer of a bacteriophage to a surface to be treated, such as a bathroom or kitchen surface (e.g., a countertop), presents a challenge in view of the non-motile nature of bacteriophages generally. This is particularly the case when the bacteriophages are incorporated into and/or applied to a solid material, wherein efficacy may depends in part on transfer of the bacteriophages from a solid material, such as a dry fibrous structure of the present invention. Because the bacteriophages do not move after application to a solid material, such as a dry fibrous structure (aside from possible Brownian motion), they may only be effective in disrupting or otherwise harming bacterial contamination if live bacteria happens to come into contact with the fixed-position bacteriophage for a sufficient period of time. Surprisingly, it is discovered herein that the present inventive dry fibrous structures comprising a bacteriophage composition facilitate the transfer of the bacteriophage and/or bacteriophages onto a surface susceptible to bacterial contamination, such as hard surfaces found in the home, manufacturing plants, hospitals, or the like, to reduce and/or eliminate the bacteria present on the surface.

In one example of the present invention, the dry fibrous structure is used to treat a surface (in need of treatment) that is susceptible to colonization by undesirable bacteria, such as any or a combination of bacteria described herein. In one example, the surface may be human and/or animal skin, such as infant skin or wounded skin. In another example, the surface to be treated may be a hard surface, such as a bathroom, kitchen, floor, or other household surface, or it may be an industrial surface, such as any surface within a manufacturing plant.

In one example, the surface to be treated by the dry fibrous structure of the present invention may be dry or substantially dry, such as a kitchen or bathroom countertop, or other hard surface when contacted with the dry fibrous structure.

In yet another example, the surface to be treated by the dry fibrous structure may be wet (have a liquid present thereon), such as a kitchen or bathroom countertop, or other hard surface, that has been, for example, sprayed with a traditional cleaning solution or even merely water or another liquid when contacted with the dry fibrous structure.

In still another example, the dry fibrous structure may be contacted with a liquid, such as water or other cleaning solution to produce a liquid-containing fibrous structure, prior to the contacting the surface to be treated, which may itself be dry or substantially dry or wet.

In yet another example, a method for treating a surface in need of treatment using a dry fibrous structure according to the present invention comprises the step of contacting the surface with a liquid concurrently with contacting the surface with the dry fibrous structure.

In still yet another example, a method for treating a surface in need of treatment using a dry fibrous structure according to the present invention comprises the steps of contacting the dry fibrous structure with a liquid to produce a liquid-containing fibrous structure and then contacting a surface with or without a liquid concurrently with or prior to contacting the surface with the liquid containing fibrous structure.

In one example, the dry fibrous structure may comprise one or more indicia that communicate the presence or absence or level of any surface care composition (bacteriophage composition) and/or bacteriophages present on the dry fibrous structure. In one example, the indicia may be selected from the group consisting of: (1) communication to a user that a surface care composition (bacteriophage composition) and/or bacteriophage is present or absent on the fibrous structure; (2) indicia for communication to a user that at least a portion of the surface care composition (bacteriophage composition) and/or bacteriophage has been transferred from the dry fibrous structure to a surface; and (3) any combination thereof.

In one example, the dry fibrous structure comprises indicia for communication to a user that a surface care composition (bacteriophage composition) and/or bacteriophage is present on and/or in the dry fibrous structure. For example, with a two-sided paper towel, it is possible that the bacteriophage composition resides on one side of the planar paper towel, but not the other. In order to ensure that the user contacts the surface that is susceptible to bacterial contamination with the side of the paper towel in which the bacteriophage composition resides, such side could contain an indicator such as a sensor, colors, ink, dye, pigment, shading, design, picture, word, symbol, graphic, image, or any combination thereof, or any of a variety of other indicators that communicates to the user that such side of the planar paper towel should be the side that is contacted to the surface while in use.

In addition, other indicia could indicate that at least a portion of the bacteriophage composition and/or bacteriophage has been transferred from the dry fibrous structure to a surface during contact between the dry fibrous structure and the surface, such as during use of the dry fibrous structure. Continuing with the non-limiting example of the paper towel, the paper towel could contain a colored indicator that communicates that a certain amount of bacteriophage composition and/or bacteriophage resides on and/or in the paper towel, and this colored indicator could change in some manner once at least a portion of the bacteriophage composition and/or bacteriophage is transferred from the paper towel (dry fibrous structure) to the desired surface (e.g., a kitchen countertop). This and the foregoing indicators may be present on the dry fibrous structure via any of a variety of different mechanisms such as, for example, printing the bacteriophage composition and/or bacteriophage and the indicia onto a surface of the fibrous structure to produce the dry fibrous structure of the present invention.

In one example, the bacteriophage composition further comprises the indicia.

The dry fibrous structures of the present invention comprise at least 10 and/or at least $10^2$ and/or at least $10^3$ and/or at least $10^4$ and/or at least $10^5$ and/or at least $10^6$ PFUs (plaque-forming units) of the one or more bacteriophage. In one example, the dry fibrous structures of the present invention comprise from about 10 to about $10^{10}$ and/or from about 10 to about $10^9$ and/or from about $10^2$ to about $10^9$ and/or from about $10^3$ to about $10^9$ and/or from about $10^3$ to about $10^8$ PFUs of the one or more bacteriophage. In still another example, the dry fibrous structures of the present invention comprise from about 10 to about $10^8$ and/or from about $10^2$ to about $10^8$ and/or from about $10^3$ to about $10^6$ PFUs/cm$^2$ of the one or more bacteriophage.

In one example, the dry fibrous structures of the present invention exhibit a geometric mean (GM) Peak Elongation of greater than 10% and/or greater than 15% and/or greater than 20% and/or greater than 25% as measured according to the Tensile Test Method described herein.

In another example, the dry fibrous structures of the present invention exhibit a geometric mean (GM) Dry Tensile Strength of greater than 200 g/in and/or greater than 250 g/in and/or greater than 300 g/in and/or greater than 350 g/in and/or greater than 400 g/in and/or greater than 500 g/in and/or greater than 750 g/in as measured according to the Tensile Test Method described herein.

In still another example, the dry fibrous structures of the present invention exhibit a geometric mean (GM) Modulus of less than 20,000 and/or less than 15,000 and/or less than 10,000 and/or less than 5,000 and/or less than 3,000 and/or less than 1,500 and/or less than 1,200 to about 0 and/or to about 100 and/or to about 300 and/or to about 500 and/or to about 700 g/cm at 15 g/cm as measured according to the Tensile Test Method described herein.

The dry fibrous structures of the present invention may further comprise a skin care lotion or a carrier lotion. The skin care lotion may be a component of the bacteriophage composition, or it may be a separate composition. Examples of suitable lotions include, but are not limited to, those described in U.S. Pat. Nos. 5,607,760; 5,609,587; 5,635,191; 5,643,588; and 5,968,025, and as described in U.S. Application No. 61/391,353. Bacteriophage compositions may be applied onto the skin care composition, for example, in the manner described in U.S. Pat. No. 7,166,292, such that the bacteriophages sit within or on the skin care composition to prevent the bacteriophages from saturating into the dry fibrous structure, thus migrating away from the top transfer plane of the dry fibrous structure. Alternatively, sections of the dry fibrous structure may comprise the skin care lotion, while adjacent areas of the dry fibrous structure may comprise a bacteriophage composition. In one embodiment, the bacteriophage composition and the skin care lotion may be stripes oriented in a longitudinal direction of the dry fibrous structure.

In one example, any of the fibrous structures of the present invention described herein comprising a surface care composition comprising one or more bacteriophage may be in the form of a roll of fibrous structure (single-ply or multi-ply), for example a dry fibrous structure roll, and may exhibit a roll bulk (in units of cm$^3$/g) of greater than 4 and/or greater than 6 and/or greater than 8 and/or greater than 10 and/or greater than 12 and/or to about 20 and/or to about 18 and/or to about 16 and/or to about 14 and/or from about 4 to about 20 and/or from about 4 to about 12 and/or from about 8 to about 20 and/or from about 12 to about 16.

In one example, any of the fibrous structures of the present invention described herein comprising a surface care composition comprising one or more bacteriophage may be in the form of a roll of fibrous structure (single-ply or multi-ply), for example a dry fibrous structure roll, and may exhibit a % compressibility (in units of %) of less than 10 and/or less than 8 and/or less than 7 and/or less than 6 and/or less than 5 and/or less than 4 and/or less than 3 to about 0 and/or to about 0.5 and/or to about 1 and/or from about 4 to about 10 and/or from about 4 to about 8 and/or from about 4 to about 7 and/or from about 4 to about 6 as measured according to the Percent Compressibility Test Method described herein.

In one example, any of the fibrous structures of the present invention described herein comprising a surface care composition comprising one or more bacteriophage may be in the form of a roll of fibrous structure (single-ply or multi-ply), for example a dry fibrous structure roll, and may exhibit a roll bulk (in units of cm$^3$/g) of greater than 4 and/or greater than 6 and/or greater than 8 and/or greater than 10 and/or greater than 12 and/or to about 20 and/or to about 18 and/or to about 16 and/or to about 14 and/or from about 4 to about 20 and/or from about 4 to about 12 and/or from about 8 to about 20 and/or from about 12 to about 16 and a % compressibility (in units of %) of less than 10 and/or less than 8 and/or less than 7 and/or less than 6 and/or less than 5 and/or less than 4 and/or less than 3 to about 0 and/or to about 0.5 and/or to about 1 and/or from about 4 to about 10 and/or from about 4 to about 8 and/or from about 4 to about 7 and/or from about 4 to about 6 as measured according to the Percent Compressibility Test Method described herein. In one example, such a dry fibrous structure roll exhibits a roll bulk of greater than 4 cm$^3$/g and a % compressibility of less than 10% as measured according to the Percent Compressibility Test Method. In another example, such a dry fibrous structure roll exhibits a roll bulk of greater than 6 cm$^3$/g and a compressibility of less than 8% as measured according to the Percent Compressibility Test Method. In still another example, such a dry fibrous structure roll exhibits a roll bulk of greater than 8 cm$^3$/g and a % compressibility of less than 7% as measured according to the Percent Compressibility Test Method.

One or more of the fibrous structures of the present invention described herein comprising a surface care composition comprising one or more bacteriophage may be in the form of a roll of fibrous structure (single-ply or multi-ply), for example a dry fibrous structure roll, and may be packaged in a package, such as a film package, comprising a one or more, for example a plurality of dry fibrous structure rolls. Such package material, for example films, may contain ingredients suitable for protecting the fibrous structures of the present invention from degradation, such as via UV light.

The fibrous structure, for example dry fibrous structure, of the present invention may be formed into a roll according to a method comprising the step of spirally winding the fibrous structure, for example dry fibrous structure, comprising a surface care composition (bacteriophage composition) comprising one or more bacteriophage to form a fibrous structure, for example dry fibrous structure, roll according to the present invention.

Surface Care Composition (Bacteriophage Composition)

The surface care composition of the present invention comprises one or more bacteriophage. In one example, the bacteriophage composition comprises two or more and/or three or more and/or four or more and/or five or more and/or a cocktail of bacteriophage. In one example, the bacteriophage composition of the present invention comprises six bacteriophage, such as the bacteriophage cocktail LIST-SHIELD™ (LMP-102™), commercially available from Intralytix, Inc., Baltimore, Md.

As used herein, the term "bacteriophage" refers to a particular bacteriophage that is effective against one or more bacterial strains. As used in this context, "effective against" means that the referenced bacteriophage infects, lyses, destructs, disrupts, kills, inhibits the growth of, reduces, inactivates or is otherwise effective against to the referenced strain of bacteria. In one example, the bacteriophage is a lytic bacteriophage, and therefore is capable of infecting and killing the target bacteria. As used herein, "bacteria" or "target bacteria" refer to an undesirable microorganism susceptible to infection, lysis, destruction (e.g., apoptosis), disruption, death, or inhibited growth, or any alternate mode of cell death caused by a bacteriophage. Different bacteriophage may infect different strains of bacteria with different results, or may infect some strains of bacteria but not others. In one example, the bacteria or target bacteria is pathogenic bacteria (i.e., bacteria that are capable of causing infection). However, other bacteria, such as bacteria that are the source of malodor or other undesirable characteristics, are appropriate target bacterial as well.

The bacteriophage may be, independently, wild-type or genetically modified, or any combination thereof. In one example, one or more of the bacteriophage present in the bacteriophage composition are wild-type. In another embodiment, all of the bacteriophage present in the bacteriophage composition are wild-type.

In one example of the present invention, one or more of the bacteriophage is a lytic bacteriophage, and is therefore capable of infection, destruction, and bacterial cell death.

In another example of the present invention, one or more of the bacteriophage is of the taxonomic family selected from the group consisting of Siphoviridae, Podoviridae, Myoviridae, and any combinations thereof. In one example, one or more of the bacteriophage is of the taxonomic family Myoviridae. In one example, all of the bacteriophage is of the taxonomic family Myoviridae.

In still another example, one or more of the bacteriophage is a lytic bacteriophage of the taxonomic family Myoviridae. In a further embodiment, wherein the bacteriophage composition comprises two or more bacteriophage, then two or more of the bacteriophage are a lytic bacteriophage of the taxonomic family Myoviridae. In a further embodiment, wherein the bacteriophage composition comprises three or more bacteriophage, then three or more of the bacteriophage are a lytic bacteriophage of the taxonomic family Myoviridae.

In yet another example, the bacteriophage is a lytic bacteriophage of the taxonomic family Myoviridae and the taxonomic subfamily Teequatrovirinae. In one example, the bacteriophage is a lytic T4 phage. Non-limiting examples include Enterobacteria phage T2, Enterobacteria phage T4, Enterobacteria phage T6, phage JS10, phage JS98, phage RB51, and any combinations thereof.

In one example, the bacteriophage is effective against gram-positive pathogenic bacteria. In one example herein, the bacteriophage is effective against gram-negative pathogenic bacteria. In one example, herein the bacteriophage is effective against a combination of gram-negative and gram-positive pathogenic bacteria.

In one example, the bacteriophage is effective against Enterobacterium such as, for example, Salmonella, Escherichia, or Shigella. Additionally or alternatively, one of more of the bacteriophage is effective against a strain of bacteria of a taxonomic genus selected from the group consisting of Streptococcus, Escherichia, Salmonella, Listeria, Shigella, Campylobacter, Clostridium, Staphylococcus, Pseudomonas, Mycobacterium, and any combinations thereof. In one example, one of more of the bacteriophage is effective against a strain of bacteria of a taxonomic genus selected from the group consisting of Streptococcus, Escherichia, Salmonella, Listeria, Staphylococcus, Pseudomonas, and any combinations thereof.

In another example of the present invention, the bacteriophage is effective against Streptococcus. In one example, the Streptococcus bacteria is Streptococcus pyogenes.

In yet another example, the bacteriophage is effective against Escherichia. In one example, the Escherichia bacteria is Escherichia coli.

In still another example, the bacteriophage is effective against Salmonella. In one example, the Salmonella bacteria is selected from the group consisting of Salmonella enteritidis, Salmonella typhimurium, Salmonella heidelberg, Salmonella newport, Salmonella hadar, and any combinations thereof. In one example, the Salmonella bacteria is Salmonella enteritidis. In one example herein, the bacteriophage is a combination of bacteriophage such as, for example, SAL-MOLYSE™, containing six bacteriophage and commercially available from Intralytics, Inc., Baltimore, Md. In one example herein, the bacteriophage is a combination of bacteriophage such as, for example, SALMOFRESH™, containing six bacteriophage and commercially available from Intralytix, Inc., Baltimore, Md. In one example herein, the bacteriophage may be, for example, SALMONELEX™, a broad-spectrum combination of bacteriophage commercially available from Micreos B.V.

In one example, the bacteriophage is effective against *Listeria*. In one example, the *Listeria* bacteria is *Listeria monocytogenes*. In one example herein, the bacteriophage is a combination of bacteriophage such as, for example, LIST-SHIELD™ (LMP-102™), containing six bacteriophage and commercially available from Intralytix, Inc., Baltimore, Md. In one example herein, the bacteriophage may be, for example, LISTEX™ P100, a broad-spectrum combination of bacteriophage commercially available from Micreos B.V.

In one example, the bacteriophage is effective against *Shigella*. In one example, the *Shigella* bacteria is *Shigella sonnei* or *Shigella flexneri*.

In another example, the bacteriophage is effective against *Campylobacter*. In one example, the *Campylobacter* bacterium is *Campylobacter jejuni*.

In one example, the bacteriophage is effective against *Clostridium*. In one example, the *Clostridium* bacterium is *Clostridium botulinum*.

In one example, the bacteriophage is effective against *Staphylococcus*. In one example, the *Staphylococcus* bacteria is *Staphylococcus aureus*.

In one example, the bacteriophage is effective against *Pseudomonas*. In one example, the *Pseudomonas* bacteria is *Pseudomonas aeruginosa*.

In one example, the bacteriophage is effective against *Mycobacterium*. In one example, the *Mycobacterium* bacteria is *Mycobacterium tuberculosis*.

In one example, at least one of the one or more bacteriophage is a lytic bacteriophage. In another example, at least one of the one or more bacteriophage is effective against a strain of bacteria of a taxonomic genus selected from the group consisting of *Streptococcus, Escherichia, Salmonella, Listeria, Shigella, Campylobacter, Clostridium, Staphylococcus, Pseudomonas, Mycobacterium*, and any combinations thereof. In still another example, at least one of the one or more bacteriophage is effective against a strain of *Streptococcus* bacteria. In even another example, at least one of the one or more bacteriophage is effective against a strain of *Escherichia* bacteria. In still another example, at least one of the one or more bacteriophage is effective against a strain of *Salmonella* bacteria. In yet another example, at least one of the one or more bacteriophage is effective against a strain of *Listeria* bacteria. In even another example, at least one of the one or more bacteriophage is effective against a strain of *Shigella* bacteria. In still yet another example, at least one of the one or more bacteriophage is effective against a strain of *Campylobacter* bacteria. In even still yet another example, at least one of the one or more bacteriophage is effective against a strain of *Clostridium* bacteria. In one example, at least one of the one or more bacteriophage is effective against a strain of *Staphylococcus* bacteria. In one example, at least one of the one or more bacteriophage is effective against a strain of *Pseudomonas* bacteria. In one example, at least one of the one or more bacteriophage is effective against a strain of *Mycobacterium* bacteria. In another example, at least one of the one or more bacteriophage is of a taxonomic family selected from the group consisting of Siphoviridae, Podoviridae, Myoviridae, and combinations thereof. In still another example, at least one of the one or more of the bacteriophage is of the taxonomic family Myoviridae.

Methods for Making Dry Fibrous Structures

In one example, the dry fibrous structures of the present invention may be made by applying a surface care composition (bacteriophage composition) comprising one or more bacteriophage to a fibrous structure, such as by contacting a surface of the fibrous structure with the surface care composition such that a fibrous structure, for example a dry fibrous structure, comprising the bacteriophage composition is produced.

Non-limiting examples of applying a surface care composition of the present invention to a fibrous structure to produce a dry fibrous structure according to the present invention include printing, such as gravure roll printing and/or flexographic printing, spraying, delivering via a permeable roll applicator, dipping, brushing, extruding, and other suitable means known in the art for delivering an additive to a fibrous structure. If the surface care composition of the present invention is a liquid composition at the time of application and/or if the fibrous structure contains a liquid such that the fibrous structure exhibits a water content of 20% or greater by weight of the fibrous structure then the fibrous structure may be dried by suitable drying means to produce the dry fibrous structure of the present invention.

Methods for Treating Surfaces

The present invention is further directed to methods of contacting a surface with one or more bacteriophage, comprising the step of contacting the surface with a fibrous structure, for example a dry fibrous structure, comprising one or more bacteriophage according to the present invention. The surface may be any surface that is susceptible to bacterial contamination. The surface is contacted with the fibrous structure, for example dry fibrous structure, such that at least a portion of the surface care composition (bacteriophage composition) is transferred from the fibrous structure to the surface.

In one example, the method for treating a surface may further comprise contacting the surface with a liquid concurrently with and/or prior to contacting the surface with the fibrous structure, for example dry fibrous structure.

Alternatively, or in addition to the above, the method for treating a surface may further comprise the step of contacting the fibrous structure, for example dry fibrous structure, of the present invention with a liquid to produce a liquid-containing fibrous structure; and then contacting the surface to be treated with the liquid-containing fibrous structure, for example such that at least a portion of the surface care composition (bacteriophage composition) is transferred to the surface.

Alternatively, or in addition to the above, the method for treating a surface may further comprise contacting the surface with a liquid composition concurrently with and/or prior to contact the surface with the liquid-containing fibrous structure.

To illustrate, the surface may be a surface found within a kitchen ("a kitchen surface"). Non-limiting examples of kitchen surfaces include surfaces susceptible to bacterial contamination through ordinary use, commonly touched by a user, in contact with food, or otherwise in contact with a source of bacteria (whether interior or exterior to the kitchen item) such as sinks; drains; faucets; faucet handles; refrigerators, freezers, microwaves, ovens, stoves, toasters, and other kitchen appliances; cabinets; shelves; countertops; drawers; backsplashes; walls; floors; fans; and the like, including any single item of the foregoing or any combination thereof.

As another illustration, the surface may be a surface found within a bathroom ("a bathroom surface)" Non-limiting examples of bathroom surfaces include surfaces susceptible to bacterial contamination through ordinary use, commonly touched by a user, or otherwise in contact with a source of bacteria. (whether interior or exterior to the bathroom item)

such as sinks; drains, faucets; faucet handles; cabinets; shelves; countertops; drawers; backsplashes; walls; floors; fans; showers, bathtubs or other basins; toilets; soap dispensers; towel dispensers; and the like, including single item of the foregoing or any combination thereof.

As another illustration, the surface may be skin, or another epithelial surface, of a human or other animal (including, for example, a companion animal such as a dog or cat) ("an epithelial surface").

In one example herein, at least a portion of the one or more bacteriophage is releasably transferred from the dry fibrous structure to the surface. In one example, from about 10 PFUs to about $10^{10}$ PFUs of the one or more bacteriophage is releasably transferred from the dry fibrous structure to the surface. In one example, such transfer is readily accomplished wherein the bacteriophage composition is contained on a surface of the dry fibrous structure that may come in contact with the surface that is susceptible to bacterial contamination. For example, with respect to a two-ply tissue product, the two-ply tissue product may comprise bacteriophage composition on the outer surface of one of the plies of the product. In another example, with respect to facial tissue, the facial tissue may comprise bacteriophage composition on the surface of the tissue that comes into contact with skin during ordinary use.

In one example, the surface susceptible to bacterial contamination is substantially dry. For example, a kitchen countertop that is substantially dry may be treated with a fibrous structure herein, such as a paper towel. In one example, the methods of the invention comprise wetting the fibrous structure prior to contacting the surface with at least a portion of the fibrous structure.

In another embodiment, the surface susceptible to bacterial contamination is not substantially dry. For example, a user could wet the surface, such as to spray a kitchen countertop with water or a standard liquid cleaner prior to wiping the countertop with an fibrous structure herein, such as a paper towel. In one example, the wetting occurs prior to contacting the surface with at least a portion of the fibrous structure. In one example, even wherein the surface is not substantially dry, the methods could also include wetting the fibrous structure prior to contacting the surface with at least a portion of the fibrous structure.

In one example, in addition to reducing and/or eliminating existing bacteria on a surface, the bacteriophage composition and/or bacteriophages provide residual performance to help prevent and/or inhibit and/or minimize bacteria colonization on the surface previously treated with a dry fibrous structure according to the present invention.

NON-LIMITING EXAMPLES

Example 1

This example describes the feasibility of transferring bacteriophage from a disposable paper towel onto a solid surface.

Preparation
1. Prepare carriers
   a. Dilute fetal bovine serum to 5% (if at 100% add 1 mL to 19 mL sterile water)
   b. Dip 7 sterile glass slides into serum-to replicate organic load found on a surface
   c. Allow to dry at 37° C. for 40 minutes
2. Spray 5 BOUNTY® paper towels (commercially available from The Procter & Gamble Company, Cincinnati, Ohio) with SALMOLYSE® bacteriophage cocktail ($10^9$ PFU/mL, 10 sprays ~3 mL) (commercially available from Intralytics, Inc., Baltimore, Md.).
3. Fold paper towel in half three times
4. Wipe paper towel across the glass slide five times
   a. Complete a total of 5 sample replicates
5. Place slide into 20 mL sterile saline in a 50 mL conical
   a. Vortex 30s
   b. Pass saline through 0.2 um filter and collect filtrate
6. Complete negative control
   a. Wipe slide with untreated paper towel and complete like above
7. Complete positive controls
   a. Add 50 ul of phage directly onto slide
      i. Place slide into 50 mL conical with 20 mL sterile saline
      ii. Vortex
      iii. Filter
8. Complete plaque assay (using *Salmonella Enteritidis* 781)
   a. Complete, 10 fold serial dilutions on all test samples use each dilution
   b. Negative control no diluting needed
   c. Positive controls complete 4, 10 fold serial dilutions assay dilutions 2, 3, 4

Results

TABLE 1

| PFU applied | PFU per sq cm | PFU per surface used to wipe |
| --- | --- | --- |
| 9.30E+09 | 1.26E+07 | 1.16E+09 |

TABLE 2

| Sample | Dilution | Plate Count | PFU/slide | LOG |
| --- | --- | --- | --- | --- |
| Phage Titer | 7 | 31 | 3.10E+09 | 9.4914 |
| Positive Control | 4 | 82 | 1.64E+08 | 8.2148 |
| Negative Control | 0 | 0 | 0.00E+00 | 0.0000 |
| Replicate 1 | 1 | 18 | 3.60E+04 | 4.5563 |
| Replicate 2 | 1 | 153 | 3.06E+05 | 5.4857 |
| Replicate 3 | 1 | 22 | 4.40E+04 | 4.6435 |
| Replicate 4 | 1 | 175 | 3.50E+05 | 5.5441 |
| Replicate 5 | 2 | 30 | 6.00E+05 | 5.7782 |
| | | Average: | 2.67E+05 | 5.2015 |

As shown in Tables 1 and 2 above, bacteriophage can be successfully transferred from a paper towel onto a solid surface. Here, about 5 of the possible 8 logs of bacteriophage present on the paper towel are transferred from the paper towel onto the slide. This testing is completed with paper towel that had not completely dried and carriers that are also partially wet. While paper towels are typically used on moist surfaces, the paper towel itself is initially dry.

Example 2 describes the impact on the amount of bacteriophage transferred to the surface based on whether the paper towel is pre-wetted or dry during use and whether the solid surface that is wiped is pre-wetted or dry during wiping.

Preparation
1. Prepare carriers
   a. Dilute fetal bovine serum to 5%
   b. Dip 22 sterile glass slides into serum-to replicate organic load found on a surface
   c. Allow to dry 2. Spray 20 BOUNTY® paper towels (commercially available from The Procter & Gamble Company, Cincinnati, Ohio) with T4 bacteriophage ($10^9$ PFU/mL a 1:10 dil of lysate, titer to confirm concentration)
   a. 10 sprays per paper towel (~3 mL)
   b. Fold paper towel in half three times
3. With paper towel still wet, wipe paper towel across the DRY glass slide five times
   a. Complete a total of 5 sample replicates
4. Place slide into 20 mL sterile saline in a 50 mL conical
   a. Vortex 30s
   b. Pass saline through 0.2 um filter and collect filtrate
5. Mist 5 carriers with PBS spray to wet (2 sprays)
   a. With paper towel still wet, wipe paper towel across the WET glass slide five times
   b. Complete a total of 5 sample replicates
6. Place slide into 20 mL sterile saline in a 50 mL conical
   a. Vortex 30s
   b. Pass saline through 0.2 um filter and collect filtrate
7. Allow remaining 10 paper towels to dry
8. Wipe DRY paper towel across the DRY glass slide five times
   a. Complete a total of 5 sample replicates
9. Place slide into 20 mL sterile saline in a 50 mL conical
   a. Vortex 30s
   b. Pass saline through 0.2 um filter and collect filtrate
10. Mist 5 carriers with PBS spray to wet (2 sprays)
11. Wipe DRY paper towel across the WET glass slide five times
    a. Complete a total of 5 sample replicates
12. Place slide into 20 mL sterile saline in a 50 mL conical
    a. Vortex 30s
    b. Pass saline through 0.2 um filter and collect filtrate
13. Complete negative control
    a. Wipe 1 carrier with untreated paper towel and complete like above
14. Place slide into 20 mL sterile saline in a 50 mL conical
    a. Vortex 30s
    b. Pass saline through 0.2 um filter and collect filtrate
14. Complete positive control
    a. Add 100 ul of phage directly onto slide (same sample as sprayed onto paper towels)
    b. Apply so that it covers about the same area of the slide as what you wiped
    c. Allow to dry a bit (no obvious puddles)
       i. Place slide into 50 mL conical with 20 mL sterile saline
       ii. Vortex
       iii. Filter
15. Complete plaque assay (using *E. coli*)
    a. Complete 4, 10 fold serial dilutions on all test samples
       use each dilution
    b. Negative control no diluting needed
    c. Positive controls complete 4, 10 fold serial dilutions assay dilutions 2, 3, 4

Results

TABLE 4

| Dry Towel -> Wet Surface | Dilution | Plate Count | Pfu/slide | LOG |
|---|---|---|---|---|
| Replicate 1 | 0 | 100 | 2.00E+04 | 4.3010 |
| Replicate 2 | 0 | 7 | 1.40E+03 | 3.1461 |
| Replicate 3 | 0 | 171 | 3.42E+04 | 4.5340 |

TABLE 4-continued

| Dry Towel -> Wet Surface | Dilution | Plate Count | Pfu/slide | LOG |
|---|---|---|---|---|
| Replicate 4 | 0 | 420 | 8.40E+04 | 4.9243 |
| Replicate 5 | 0 | 163 | 3.26E+04 | 4.5132 |
| | | Average: | 3.44E+04 | 4.2837 |

TABLE 3

| Dry Towel -> Dry Surface | Dilution | Plate Count | Pfu/slide | LOG |
|---|---|---|---|---|
| Replicate 1 | 0 | 66 | 1.32E+04 | 4.1206 |
| Replicate 2 | 0 | 143 | 2.86E+04 | 4.4564 |
| Replicate 3 | 0 | 34 | 6.80E+03 | 3.8325 |
| Replicate 4 | 0 | 72 | 1.44E+04 | 4.1584 |
| Replicate 5 | 0 | 79 | 1.58E+04 | 4.1987 |
| | | Average: | 1.58E+04 | 4.1533 |

TABLE 6

| Wet Towel -> Wet Surface | Dilution | Plate Count | Pfu/slide | LOG |
|---|---|---|---|---|
| Replicate 1 | 0 | 428 | 8.56E+04 | 4.9325 |
| Replicate 2 | 0 | 281 | 5.62E+04 | 4.7497 |
| Replicate 3 | 0 | 468 | 9.36E+04 | 4.9713 |
| Replicate 4 | 0 | 238 | 4.76E+04 | 4.6776 |
| Replicate 5 | 0 | 368 | 7.36E+04 | 4.8669 |
| | | Average: | 7.13E+04 | 4.8396 |

TABLE 5

| Wet Towel -> Dry Surface | Dilution | Plate Count | Pfu/slide | LOG |
|---|---|---|---|---|
| Replicate 1 | 0 | 232 | 4.64E+04 | 4.6665 |
| Replicate 2 | 0 | 406 | 8.12E+04 | 4.9096 |
| Replicate 3 | 0 | 206 | 4.12E+04 | 4.6149 |
| Replicate 4 | 0 | 298 | 5.96E+04 | 4.7752 |
| Replicate 5 | 0 | 178 | 3.56E+04 | 4.5514 |
| | | Average: | 5.28E+04 | 4.7035 |

In this Example 2, the highest amount of bacteriophage transferred from a paper towel to a surface occurs when both the paper towel and the surface are pre-wetted (water content of 20% or greater by weight of the dry fibrous structure at time of use). The least amount of transfer is seen when both the paper towel and the surface are dry (water content less than 20% by weight of the dry fibrous structure at time of use). Overall, using a dry towel on a wet or dry surface has a similar level of bacteriophage transfer. A similar level of bacteriophage transfer is also seen when a pre-wetted paper towel is used on a wet or dry surface.

NON-LIMITING EXAMPLES OF DRY FIBROUS STRUCTURES

Example 3

Paper Towel

Examples of dry fibrous structures; namely, paper towels, are produced utilizing a cellulosic pulp fiber furnish consisting of about 55% refined softwood furnish consisting of about 44% Northern Bleached Softwood Kraft (Bowater), 44% Northern Bleached Softwood Kraft (Celgar) and 12%

Southern Bleached Softwood Kraft (Alabama River Softwood, Weyerhaeuser); about 30% of unrefined hardwood *Eucalyptus* Bleached Kraft consisting of about 80% (Fibria) and 20% NBHK (Aspen) (Peace River); and about 15% of an unrefined furnish consisting of a blend of about 27% Northern Bleached Softwood Kraft (Bowater), 27% Northern Bleached Softwood Kraft (Celgar), 42% *Eucalyptus* Bleached Kraft (Fibria) and 7% Southern Bleached Kraft (Alabama River Softwood, Weyerhaeuser). The 55% refined softwood is refined as needed to maintain target wet burst at the reel. Any furnish preparation and refining methodology common to the papermaking industry can be utilized.

A 3% active solution Kymene 5221 is added to the refined softwood line prior to an in-line static mixer and 1% active solution of Wickit 1285, an ethoxylated fatty alcohol available from Ashland Inc. is added to the unrefined *Eucalyptus* Bleached Kraft (Fibria) hardwood furnish. The addition levels are 21 and 1 lbs active/ton of paper, respectively.

The refined softwood and unrefined hardwood and unrefined NBSK/SSK/*Eucalyptus* bleached kraft/NDHK thick stocks are then blended into a single thick stock line followed by addition of 1% active carboxymethylcellulose (CMC-Finnfix) solution at 7 lbs active/ton of paper towel, and optionally, a softening agent may be added.

The thick stock is then diluted with white water at the inlet of a fan pump to a consistency of about 0.15% based on total weight of softwood, hardwood and simulated broke fiber. The diluted fiber slurry is directed to a non layered configuration headbox such that the wet web formed onto a Fourdrinier wire (foraminous wire). Optionally, a fines retention/drainage aid may be added to the outlet of the fan pump.

Dewatering occurs through the Fourdrinier wire and is assisted by deflector and vacuum boxes. The Fourdrinier wire is of a 5-shed, satin weave configuration having 87 machine-direction and 76 cross-direction monofilaments per inch, respectively. The speed of the Fourdrinier wire is about 750 fpm (feet per minute).

The embryonic wet web is transferred from the Fourdrinier wire at a fiber consistency of about 24% at the point of transfer, to a belt, such as a patterned belt through-air-drying resin carrying fabric. In the present case, the speed of the patterned through-air-drying fabric is approximately the same as the speed of the Fourdrinier wire. In another case, the embryonic wet web may be transferred to a patterned belt and/or fabric that is traveling slower, for example about 20% slower than the speed of the Fourdrinier wire (for example a wet molding process).

Further de-watering is accomplished by vacuum assisted drainage until the web has a fiber consistency of about 30%.

While remaining in contact with the patterned belt, the web is pre-dried by air blow-through pre-dryers to a fiber consistency of about 65% by weight.

After the pre-dryers, the semi-dry web is transferred to a Yankee dryer and adhered to the surface of the Yankee dryer with a sprayed creping adhesive. The creping adhesive is an aqueous dispersion with the actives consisting of about 75% polyvinyl alcohol, and about 25% CREPETROL® R6390. Optionally a crepe aid consisting of CREPETROL® A3025 may be applied. CREPETROL® R6390 and CREPETROL® A3025 are commercially available from Ashland Inc. (formerly Hercules Inc.). The creping adhesive diluted to about 0.15% adhesive solids and delivered to the Yankee surface at a rate of about 2# adhesive solids based on the dry weight of the web. The fiber consistency is increased to about 97% before the web is dry creped from the Yankee with a doctor blade.

In the present case, the doctor blade has a bevel angle of about 45° and is positioned with respect to the Yankee dryer to provide an impact angle of about 101° and the reel is run at a speed that is about 15% faster than the speed of the Yankee. In another case, the doctor blade may have a bevel angle of about 25° and be positioned with respect to the Yankee dryer to provide an impact angle of about 81° and the reel is run at a speed that is about 10% slower than the speed of the Yankee. The Yankee dryer is operated at a temperature of about 177° C. and a speed of about 800 fpm. The fibrous structure is wound in a roll using a surface driven reel drum having a surface speed of about 656 feet per minute.

The fibrous structure may be subsequently converted into a two-ply paper towel product having a basis weight of about 45 to 54 g/m². During the converting operation, a bacteriophage composition may be applied to the fibrous structure to produce a dry fibrous structure (dry paper towel) comprising the bacteriophage composition by any suitable means, for example by printing on the bacteriophage composition to one or more surfaces of the fibrous structure.

Test Methods

Unless otherwise indicated, all tests described herein including those described under the Definitions section and the following test methods are conducted on samples that have been conditioned in a conditioned room at a temperature of 23° C.±2.2° C. and a relative humidity of 50%±10% for 2 hours prior to the test unless otherwise indicated. Samples conditioned as described herein are considered dry samples (such as "dry fibrous structures") for purposes of this invention. Further, all tests are conducted in such conditioned room.

Water Content Test Method

The water (moisture) content present in a fibrous structure is measured using the following Water Content Test Method.

A fibrous structure or portion thereof ("sample") is placed in a conditioned room at a temperature of 73° F.±4° F. (about 23° C.±2.2° C.) and a relative humidity of 50%±10% for at least 24 hours prior to testing. The weight of the sample is recorded when no further weight change is detected for at least a 5 minute period. Record this weight as the "equilibrium weight" of the sample. Next, place the sample in a drying oven for 24 hours at 70° C. with a relative humidity of about 4% to dry the sample. After the 24 hours of drying, immediately weigh the sample. Record this weight as the "dry weight" of the sample. The water (moisture) content of the sample is calculated as follows:

$$\% \text{ Water (moisture) in sample} = 100\% \times \frac{\text{(Equilibrium weight of sample} - \text{Dry weight of sample)}}{\text{Dry weight of sample}}$$

The % Water (moisture) in sample for 3 replicates is averaged to give the reported % Water (moisture) in sample.

Basis Weight Test Method

Basis weight of a fibrous structure sample is measured by selecting twelve (12) individual fibrous structure samples and making two stacks of six individual samples each. If the individual samples are connected to one another vie perforation lines, the perforation lines must be aligned on the same side when stacking the individual samples. A precision cutter is used to cut each stack into exactly 3.5 in.×3.5 in. squares. The two stacks of cut squares are combined to make a basis weight pad of twelve squares thick. The basis weight pad is then weighed on a top loading balance with a minimum resolution of 0.01 g. The top loading balance must be protected from air drafts and other disturbances using a draft shield. Weights are recorded when the readings on the top loading balance become constant. The Basis Weight is calculated as follows:

$$\text{Basis Weight (lbs/3000 ft}^2\text{)} = \frac{\text{Weight of basis weight pad (g)} \times 3000 \text{ ft}^2}{453.6 \text{ g/lbs} \times 12 \text{ samples} \times [12.25 \text{ in}^2 \text{ (Area of basis weight pad)}/144 \text{ in}^2]}$$

$$\text{Basis Weight (g/m}^2\text{)} = \frac{\text{Weight of basis weight pad (g)} \times 10{,}000 \text{ cm}^2/\text{m}^2}{79.0321 \text{ cm}^2 \text{ (Area of basis weight pad)} \times 12 \text{ samples}}$$

Bone Dry Basis Weight = Basis Weight $(g/m^2) \times$ ((100% − % Water per Water Content Test Method)/100)/10,000

Thickness Method

Thickness of a fibrous structure and/or sanitary tissue product is measured using a ProGage Thickness Tester (Thwing-Albert Instrument Company, West Berlin, N.J.) with a pressure foot diameter of 2.00 inches (area of 3.14 in$^2$) at a pressure of 95 g/in$^2$. Four (4) samples are prepared by cutting of a usable unit such that each cut sample is at least 2.5 inches per side, avoiding creases, folds, and obvious defects. An individual specimen is placed on the anvil with the specimen centered underneath the pressure foot. The foot is lowered at 0.03 in/sec to an applied pressure of 95 g/in$^2$. The reading is taken after 3 sec dwell time, and the foot is raised. The measure is repeated in like fashion for the remaining 3 specimens. The caliper is calculated as the average caliper of the four specimens and is reported in mils (0.001 in) to the nearest 0.1 mils. Conversion to cm can be made using standard conversion factors.

Density Test Method

The density of a web sample is measured by dividing the Basis Weight of the web sample by the Thickness of the web sample. Density units are reported as g/cm$^3$.

Tensile Test Method: Peak Elongation, Tensile Strength, TEA and Modulus

Peak Elongation, Tensile Strength, TEA and Tangent Modulus are measured on a constant rate of extension tensile tester with computer interface (a suitable instrument is the EJA Vantage from the Thwing-Albert Instrument Co. Wet Berlin, N.J.) using a load cell for which the forces measured are within 10% to 90% of the limit of the cell. Both the movable (upper) and stationary (lower) pneumatic jaws are fitted with smooth stainless steel faced grips, 25.4 mm in height and wider than the width of the test specimen. An air pressure of about 60 psi is supplied to the jaws.

Eight usable units of a fibrous structure sample are divided into two stacks of four samples each. The samples in each stack are consistently oriented with respect to machine direction (MD) and cross direction (CD). One of the stacks is designated for testing in the MD and the other for CD. Using a one inch precision cutter (Thwing Albert JDC-1-10, or similar) cut 4 MD strips from one stack, and 4 CD strips from the other, with dimensions of 1.00 in ±0.01 in wide by 3.0-4.0 in long. Each strip of one usable unit thick will be treated as a unitary specimen for testing.

Program the tensile tester to perform an extension test, collecting force and extension data at an acquisition rate of 20 Hz as the crosshead raises at a rate of 2.00 in/min (5.08 cm/min) until the specimen breaks. The break sensitivity is set to 80%, i.e., the test is terminated when the measured force drops to 20% of the maximum peak force, after which the crosshead is returned to its original position.

Set the gauge length to 1.00 inch. Zero the crosshead and load cell. Insert at least 1.0 in of the unitary specimen into the upper grip, aligning it vertically within the upper and lower jaws and close the upper grips. Insert the unitary specimen into the lower grips and close. The unitary specimen should be under enough tension to eliminate any slack, but less than 5.0 g of force on the load cell. Start the tensile tester and data collection. Repeat testing in like fashion for all four CD and four MD unitary specimens.

Program the software to calculate the following from the constructed force (g) verses extension (in) curve:

Tensile Strength is the maximum peak force (g) divided by the sample width (in) and reported as g/in to the nearest 1 g/in.

Adjusted Gauge Length is calculated as the extension measured at 3.0 g of force (in) added to the original gauge length (in).

Peak Elongation is calculated as the extension at maximum peak force (in) divided by the Adjusted Gauge Length (in) multiplied by 100 and reported as % to the nearest 0.1%

Total Energy (TEA) is calculated as the area under the force curve integrated from zero extension to the extension at the maximum peak force (g*in), divided by the product of the adjusted Gauge Length (in) and specimen width (in) and is reported out to the nearest 1 g*in/in$^2$. Replot the force (g) verses extension (in) curve as a force (g) verses strain curve. Strain is herein defined as the extension (in) divided by the Adjusted Gauge Length (in).

Program the software to calculate the following from the constructed force (g) verses strain curve:

Tangent Modulus (Modulus) is the Modulus at 15 g/cm.

The Tensile Strength (g/in), Peak Elongation (%), Total Energy (g*in/in$^2$) and Modulus (g/cm), which is the Tangent Modulus at 15 g/cm, are calculated for the four CD unitary specimens and the four MD unitary specimens. Calculate an average for each parameter separately for the CD and MD specimens.

Calculations:

Geometric Mean Tensile Strength=Square Root of [MD Tensile Strength(g/in)×CD Tensile Strength(g/in)]

Geometric Mean Peak Elongation=Square Root of [MD Elongation (%)×CD Elongation(%)]

Geometric Mean TEA=Square Root of [MD TEA (g*in/in$^2$)×CD TEA(g*in/in$^2$)]

Geometric Mean Modulus=Square Root of [MD Modulus(g/cm)(at 15 g/cm)×CD Modulus(g/cm) (at 15 g/cm)]

Total Dry Tensile Strength(TDT)=MD Tensile Strength(g/in)+CD Tensile Strength(g/in)

Total TEA=MD TEA(g*in/in$^2$)+CD TEA(g*in/in$^2$)

Total Modulus=MD Modulus(g/cm)+CD Modulus(g/cm)

Tensile Ratio=MD Tensile Strength(g/in)/CD Tensile Strength(g/in)

Initial Total Wet Tensile Test Method

The initial total wet tensile of a dry fibrous structure is determined using a Thwing-Albert EJA Material Tester Instrument, Cat. No. 1350, equipped with 5000 g load cell available from Thwing-Albert Instrument Company, 14 Collings Ave. W. Berlin, N.J. 08091. 10% of the 5000 g load cell is utilized for the initial total wet tensile test.

i. Sample Preparation—A sample strip of dry fibrous structure to be tested [2.54 cm (1 inch) wide by greater than 5.08 cm (2 inches)] long is obtained.

ii. Operation—The test settings for the instrument are:
Crosshead speed—10.16 cm/minute (4.0 inches/minute)
Initial gauge length 2.54 cm (1.0 inch)
Adjust the load cell to read zero plus or minus 0.5 grams$_{force}$ ($g_f$)

iii. Testing Samples—One end of the sample strip is placed between the upper jaws of the machine and clamped. After verifying that the sample strip is hanging straight between the lower jaws, clamp the other end of the sample strip in the lower jaws.

a. Pre-Test—

Strain the sample strip to 25 grams$_{force}$ (+/−10 grams$_{force}$) at a strain rate of 3.38 cm/minute (1.33 inches/minute) prior to wetting the sample strip. The distance between the upper and lower jaws now being greater than 2.54 cm (1.0 inch). This distance now becomes the new zerostrain position for the forthcoming wet test described below.

b. Wet Test—

While the sample strip is still at 25 grams$_{force}$ (+1-10 grams$_{force}$), it is wetted, starting near the upper jaws, a water/0.1% Pegosperse® ML200 (available from Lonza Inc. of Allendale, N.J.) solution [having a temperature of about 73° F.±4° F. (about 23° C.±2.2° C.)] is delivered to the sample strip via a 2 mL disposable pipette. Do not contact the sample strip with the pipette and do not damage the sample strip by using excessive squirting pressure. The solution is continuously added until the sample strip is visually determined to be completely saturated between the upper and lower jaws. At this point, the load cell is re-adjusted to read 0±0.5 grams$_{force}$. The sample strip is then strained at a rate of 10.16 cm/minute (4 inches/minute) and continues until the sample strip is strained past its failure point (failure point being defined as the point on the force-strain curve where the sample strip falls to 50% of its peak strength after it has been strained past its peak strength). The straining of the sample strip is initiated between 5-10 seconds after the sample is initially wetted. The initial result of the test is an array of data points in the form of load (grams$_{force}$) versus strain (where strain is calculated as the crosshead displacement (cm of jaw movement from starting point) divided by the initial separation distance (cm) between the upper and lower jaws after the pre-test.

The sample is tested in two orientations, referred to here as MD (machine direction, i.e., in the same direction as the continuously wound reel and forming fabric) and CD (cross-machine direction, i.e., 90° from MD). The MD and CD initial wet tensile strengths are determined using the above equipment and the initial total wet tensile values are calculated in the following manner:

ITWT(g/inch)=Peak Load$_{MD}$($g_f$)/1(inch$_{width}$)+Peak Load$_{CD}$($g_f$)/1(inch$_{width}$)

Percent Compressibility Test Method

Figure 1:
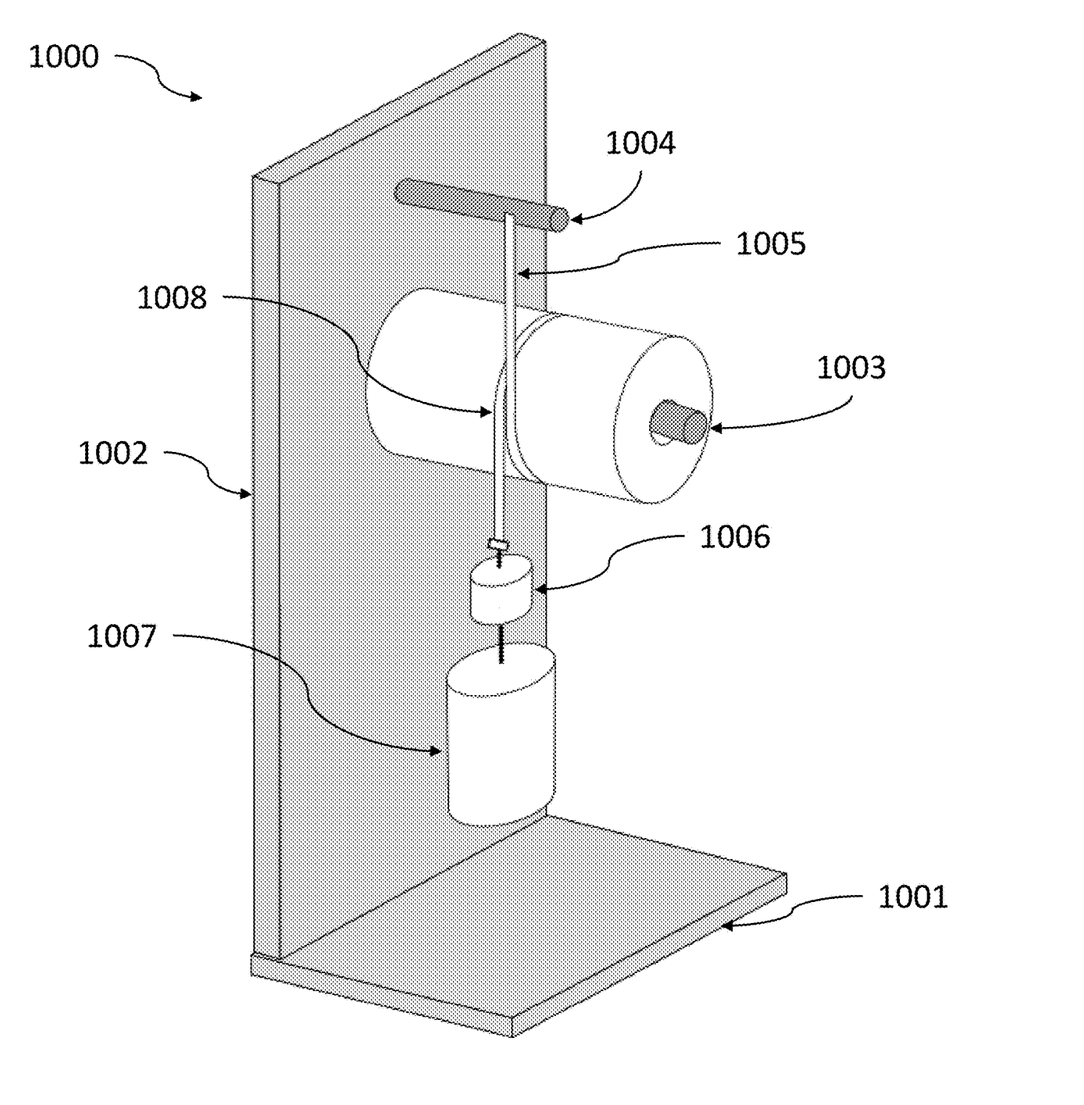
FIG. 1 is a schematic representation of a Roll Diameter Tester used in the Percent Compressibility Test Method described herein.

Percent Roll Compressibility (Percent Compressibility) is determined using the Roll Diameter Tester 1000 as shown in FIG. 1. It is comprised of a support stand made of two aluminum plates, a base plate 1001 and a vertical plate 1002 mounted perpendicular to the base, a sample shaft 1003 to mount the test roll, and a bar 1004 used to suspend a precision diameter tape 1005 that wraps around the circumference of the test roll. Two different weights 1006 and 1007 are suspended from the diameter tape to apply a confining force during the uncompressed and compressed measurement. All testing is performed in a conditioned room maintained at about 23° C.±2 C.° and about 50%±2% relative humidity.

The diameter of the test roll is measured directly using a Pi® tape or equivalent precision diameter tape (e.g. an Executive Diameter tape available from Apex Tool Group, LLC, Apex, N.C., Model No. W606PD) which converts the circumferential distance into a diameter measurement so the roll diameter is directly read from the scale. The diameter tape is graduated to 0.01 inch increments with accuracy certified to 0.001 inch and traceable to NIST. The tape is 0.25 in wide and is made of flexible metal that conforms to the curvature of the test roll but is not elongated under the 1100 g loading used for this test. If necessary the diameter tape is shortened from its original length to a length that allows both of the attached weights to hang freely during the test, yet is still long enough to wrap completely around the test roll being measured. The cut end of the tape is modified to allow for hanging of a weight (e.g. a loop). All weights used are calibrated, Class F hooked weights, traceable to NIST.

The aluminum support stand is approximately 600 mm tall and stable enough to support the test roll horizontally throughout the test. The sample shaft 1003 is a smooth aluminum cylinder that is mounted perpendicularly to the vertical plate 1002 approximately 485 mm from the base. The shaft has a diameter that is at least 90% of the inner diameter of the roll and longer than the width of the roll. A small steal bar 1004 approximately 6.3 mm diameter is mounted perpendicular to the vertical plate 1002 approximately 570 mm from the base and vertically aligned with the sample shaft. The diameter tape is suspended from a point along the length of the bar corresponding to the midpoint of a mounted test roll. The height of the tape is adjusted such that the zero mark is vertically aligned with the horizontal midline of the sample shaft when a test roll is not present.

Condition the samples at about 23° C.±2 C.° and about 50%±2% relative humidity for 2 hours prior to testing. Rolls with cores that are crushed, bent or damaged should not be tested. Place the test roll on the sample shaft 1003 such that the direction the paper was rolled onto its core is the same direction the diameter tape will be wrapped around the test roll. Align the midpoint of the roll's width with the suspended diameter tape. Loosely loop the diameter tape 1004 around the circumference of the roll, placing the tape edges directly adjacent to each other with the surface of the tape lying flat against the test sample. Carefully, without applying any additional force, hang the 100 g weight 1006 from the free end of the tape, letting the weighted end hang freely without swinging. Wait 3 seconds. At the intersection of the diameter tape 1008, read the diameter aligned with the zero mark of the diameter tape and record as the Original Roll Diameter to the nearest 0.01 inches. With the diameter tape still in place, and without any undue delay, carefully hang the 1000 g weight 1007 from the bottom of the 100 g weight, for a total weight of 1100 g. Wait 3 seconds. Again read the roll diameter from the tape and record as the Compressed Roll Diameter to the nearest 0.01 inch. Calculate percent compressibility to the according to the following equation and record to the nearest 0.1%:

$$\% \text{ Compressibility} = \frac{(\text{Original Roll Diameter}) - (\text{Compressed Roll Diameter})}{\text{Original Roll Diameter}} \times 100$$

Repeat the testing on 10 replicate rolls and record the separate results to the nearest 0.1%. Average the 10 results and report as the Percent Compressibility to the nearest 0.1%.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 μm" is intended to mean "about 40 μm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A roll of sanitary tissue comprising a sanitary tissue product comprising a plurality of dry fibrous structure sheets, wherein a surface care composition is present on surfaces of the plurality of dry fibrous structure sheets prior to the sanitary tissue product being convolutedly wound upon itself such that the surface care composition is present throughout the roll of sanitary tissue product and wherein the surface care composition comprises at least about $10^2$ PFUs of one or more bacteriophage residing on the surfaces of the plurality of dry fibrous structure sheets convolutedly wound upon itself such that sanitary tissue product exhibits all of the following properties:
   a. amoisture content of less than 20% by weight of the sanitary tissue product as measured according to the Water Content Test Method;
   b. a GM Tensile Strength of greater than 200 g/in as measured according to the Tensile Test Method;
   c. a density of less than about 0.60 g/cm³ as measured according to the Density Test Method; and
   d. a basis weight of greater than 5 g/m² to about 120 g/m² as measured according to the Basis Weight Test Method; and wherein the sanitary tissue product roll exhibits the following properties:
   i. a roll bulk of greater than 4 cm³/g; and
   ii. a % compressibility of less than 10% as measured according to the Percent Compressibility Test Method.

2. The roll of sanitary tissue product according to claim 1 wherein at least a portion of the surface care composition is transferable from the sanitary tissue product during use.

3. The roll of sanitary tissue product according to claim 1 wherein at least one of the one or more bacteriophage is a lytic bacteriophage.

4. The roll of sanitary tissue product according to claim 1 wherein at least one of the one or more bacteriophage is effective against a strain of bacteria of a taxonomic genus selected from the group consisting of *Streptococcus, Escherichia, Salmonella, Listeria, Shigella, Campylobacter, Clostridium, Staphylococcus, Pseudomonas, Mycobacterium*, and any combinations thereof.

5. The roll of sanitary tissue product according to claim 1 wherein the surface care composition comprises from about $10^2$ PFUs to about $10^9$ PFUs of the one or more bacteriophage.

6. The roll of sanitary tissue product according to claim 1 wherein at least one of the one or more bacteriophage is of a taxonomic family selected from the group consisting of Siphoviridae, Podoviridae, Myoviridae, and combinations thereof.

7. The roll of sanitary tissue product according to claim 1 wherein the sanitary tissue product further comprises an indicia selected from the group consisting of: (1) communication to a user that the sanitary tissue product comprises the surface care composition; (2) communication to a user that at least a portion of the surface care composition has been transferred from the sanitary tissue product to a surface treated with the sanitary tissue product; and (3) combinations thereof.

8. The roll of sanitary tissue product according to claim 7 wherein the indicia is selected from the group consisting of: sensors, colors, inks, dyes, pigments, shading, designs, pictures, words, symbols, graphics, images, and combinations thereof.

9. The roll of sanitary tissue product according to claim 1 wherein the sanitary tissue product roll exhibits a roll bulk of greater than 6 cm³/g.

10. The roll of sanitary tissue product according to claim 1 wherein the sanitary tissue product roll exhibits a % compressibility of less than 8% as measured according to the Percent Compressibility Test Method.

11. The roll of sanitary tissue product according to claim 1 wherein the sanitary tissue product roll exhibits a roll bulk of greater than 6 cm³/g and a % compressibility of less than 8% as measured according to the Percent Compressibility Test Method.

12. The roll of sanitary tissue product roll according to claim 1 wherein the sanitary tissue product roll exhibits a roll bulk of greater than 8 cm³/g and a % compressibility of less than 7% as measured according to the Percent Compressibility Test Method.

13. A method for making a dry fibrous structure sheet according to claim 1, wherein the method comprises the step of contacting a fibrous structure sheet with a surface care composition comprising one or more bacteriophage such that a dry fibrous structure sheet comprising the surface care composition is produced.

14. A method for treating a surface in need of treatment, the method comprises the step of contacting the surface with a dry fibrous structure sheet according to claim 1.

15. The method according to claim 14 wherein at least a portion of the surface care composition is transferred to the surface from the dry fibrous structure sheet.

16. The method according to claim 14 wherein the method further comprises contacting the surface with a liquid concurrently with contacting the surface with the dry fibrous structure sheet.

17. The method according to claim 14 wherein the method further comprises contacting the surface with a liquid prior to contacting the surface with the dry fibrous structure sheet.

18. A method for treating a surface in need of treatment, the method comprises the steps of: a. contacting the dry fibrous structure sheet according to claim 1 with a liquid to produce liquid-containing fibrous structure sheet; and b. contacting the surface with the liquid-containing fibrous structure sheet.

19. The method according to claim 18 wherein at least a portion of the surface care composition is transferred to the surface from the liquid-containing fibrous structure sheet.

20. The method according to claim 18 wherein the method further comprises contacting the surface with a liquid concurrently with contacting the surface with the liquid-containing fibrous structure sheet.

21. The method according to claim 18 wherein the method further comprises contacting the surface with a liquid prior to contacting the surface with the liquid-containing fibrous structure sheet.

22. A method for making a dry fibrous structure sheet roll according to claim 1, wherein the method comprises the step of contacting a fibrous structure sheet with a surface care composition comprising one or more bacteriophage such that a dry fibrous structure sheet comprising the bacteriophage composition is produced; and then spirally winding the dry fibrous structure to form a dry fibrous structure sheet roll.

23. A package comprising a plurality of rolls of sanitary tissue product according to claim 1.

\* \* \* \* \*